(12) United States Patent
Kumar

(10) Patent No.: US 12,091,179 B2
(45) Date of Patent: Sep. 17, 2024

(54) AIRCRAFTS, SYSTEMS, AND METHODS FOR PROVIDING CONSTANT TORQUE ON TAKEOFF

(71) Applicant: General Electric Company, Schenectady, NY (US)

(72) Inventor: Vinod S. Kumar, Bengaluru (IN)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 17/965,252

(22) Filed: Oct. 13, 2022

(65) Prior Publication Data

US 2024/0067347 A1 Feb. 29, 2024

(30) Foreign Application Priority Data

Aug. 26, 2022 (IN) .............................. 202211048927

(51) Int. Cl.
*B64D 27/02* (2006.01)
*B64D 27/10* (2006.01)
*B64D 27/24* (2006.01)
*B64D 31/00* (2006.01)
*B64D 35/00* (2006.01)
*B64D 47/00* (2006.01)
(Continued)

(52) U.S. Cl.
CPC ............. *B64D 27/10* (2013.01); *B64D 27/24* (2013.01); *B64D 31/00* (2013.01); *B64D 35/00* (2013.01); *B64D 47/00* (2013.01); *F02C 6/00* (2013.01); *F02C 7/36* (2013.01); *B64D 27/026* (2024.01)

(58) Field of Classification Search
CPC ...... B64D 27/10; B64D 27/24; B64D 27/026; B64D 31/00; B64D 35/00; B64D 47/00; F02C 7/36; F02C 6/00
See application file for complete search history.

(56) References Cited

U.S. PATENT DOCUMENTS 9,194,285 B2 * 11/2015 Botti ...................... B64C 27/14
9,446,842 B2 * 9/2016 Luyks .................... B64D 27/24
9,533,756 B2 * 1/2017 Cox ....................... G05D 1/0083
(Continued)

FOREIGN PATENT DOCUMENTS

FR 2560148 A1 8/1985
GB 2589949 A 6/2021
WO 202202319 A1 1/2022

OTHER PUBLICATIONS

Extended European Search Report for Application No. 22204946.2 dated Aug. 16, 2023 (13 pages).

*Primary Examiner* — Tye William Abell
(74) *Attorney, Agent, or Firm* — Dinsmore & Shohl LLP

(57) ABSTRACT

An aircraft includes a gas turbine engine, an electric motor, and a propulsion device. The gas turbine engine and the electric motor are configured to provide a target cumulative output to the propulsion device. An electronic control unit is configured to set the gas turbine engine to a first engine mode to provide a first engine output to the propulsion device, set the electric motor to a first motor mode to provide a first motor output to the propulsion device, a sum of the first engine output and the first motor output being within a predetermined range of the target cumulative output, and in response to a speed of the aircraft reaching a target speed and the first engine output increasing to a second engine output, set the electric motor to a second motor mode.

17 Claims, 6 Drawing Sheets

(51) Int. Cl.
 *F02C 6/00* (2006.01)
 *F02C 7/36* (2006.01)

(56) References Cited

U.S. PATENT DOCUMENTS

| | | | |
|---|---|---|---|
| 2018/0118364 A1* | 5/2018 | Golshany | B64D 31/06 |
| 2020/0277063 A1* | 9/2020 | Thomassin | B64D 27/18 |
| 2020/0277064 A1* | 9/2020 | Thomassin | B64D 27/24 |
| 2020/0277071 A1* | 9/2020 | LaTulipe | B64D 29/00 |
| 2020/0277073 A1* | 9/2020 | Thomassin | F02C 7/22 |

* cited by examiner

AIRCRAFTS, SYSTEMS, AND METHODS FOR PROVIDING CONSTANT TORQUE ON TAKEOFF

CROSS-REFERENCE TO RELATED APPLICATION

This application claims priority to Indian application 202211048927 filed on Aug. 26, 2022, the entire contents of which is hereby incorporated by reference.

TECHNICAL FIELD

The present specification generally relates to systems and methods for providing constant torque during aircraft takeoff operations and, more specifically, systems and methods for supplementing a gas turbine engine of an aircraft with power from an electric motor to provide constant torque.

BACKGROUND

During an aircraft takeoff operation, increased airflow, i.e., ram air, into a gas turbine engine of the aircraft may result in increased torque to the propeller of the aircraft. This is referred to as a torque bloom effect. Some turboprop aircrafts may be fitted with a Constant Torque on Takeoff (CTOT) mechanism that circumvents the torque bloom effect induced by ram air during takeoff. This system takes into account the ram air and adjusts the power provided by the gas turbine engines by mechanical fuel governing. However, not all turboprops are fitted with such a mechanism and, therefore, rely on the pilot to accurately set the power levers of the gas turbine engines to provide the appropriate amount of takeoff torque.

Accordingly, a need exists for improved systems and methods for ensuring that propeller torque does not exceed a target torque during a takeoff operation.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
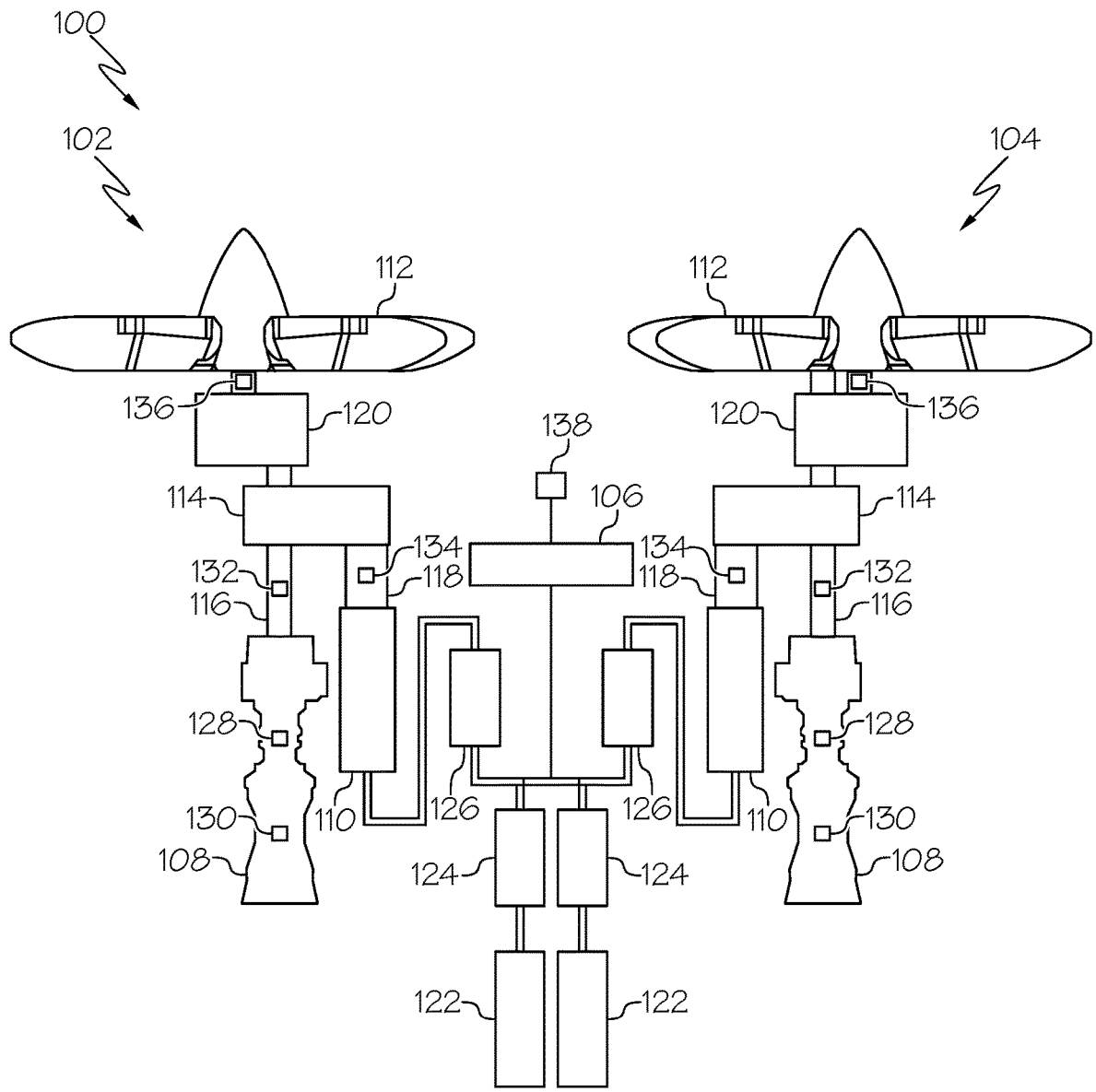
FIG. 1 schematically depicts an embodiment of an aircraft, according to one or more embodiments shown and described herein.

Embodiments described herein are directed to aircrafts, systems, and methods for supplementing a gas turbine engine of an aircraft with power from an electric motor to provide constant torque during a takeoff operation. An example aircraft includes a pair of turbine engine assemblies, each including a gas turbine engine, an electric motor, and a propulsion device operatively coupled to the gas turbine engine and the electric motor. The gas turbine engine and the electric motor are configured to provide a target cumulative output to the propulsion device. The aircraft also includes an electronic control unit configured to adjust the power provided by the electric motor to maintain the power provided to the propulsion device within a predetermined threshold of the target cumulative output. Various embodiments of the aircrafts and systems, and the operation of the aircrafts and systems are described in more detail herein. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, components of an aircraft 100 are schematically illustrated according to one or more embodiments described herein. It should be appreciated that the aircraft 100 illustrated herein is a turboprop aircraft. The aircraft 100 may generally include a first turbine engine assembly 102, a second turbine engine assembly 104, and an electronic control unit 106 for operating components of the first turbine engine assembly 102 and the second turbine engine assembly 104.

The first turbine engine assembly 102 includes a gas turbine engine 108, an electric motor 110, and a propulsion device such as, for example, a propeller 112. The propeller 112 of the aircraft 100 is powered by both the power output of the gas turbine engine 108 and the electric motor 110. Specifically, the gas turbine engine 108 and the electric motor 110 are each connected to a combining gear box 114 by an engine shaft 116 and a motor shaft 118, respectively. As such, the engine shaft 116 translates rotational power from the gas turbine engine 108 to the combining gear box 114 and the motor shaft 118 translates rotational power from the electric motor 110 to the combining gear box 114. The first turbine engine assembly 102 further includes a propeller gear box 120 positioned between the propeller 112 and the combining gear box 114. The propeller gear box 120 converts the combined rotational power from the gas turbine engine 108 and the electric motor 110, and thus from the combining gear box 114, to the propeller 112.

The first turbine engine assembly 102 further includes a high voltage energy supply 122, which may include one or more batteries. The high voltage energy supply 122 delivers a power supply to a direct current controller 124, which converts the energy received from the high voltage energy supply 122. Specifically, the direct current controller 124 increases the voltage received from the high voltage energy supply 122. In embodiments, the high voltage energy supply 122 provides a voltage equal to or greater than 600 volts and equal to or less than 1,000 volts. In embodiments, the high voltage energy supply 122 provides a voltage of about 800 volts. In embodiments, the direct current controller 124 increases the voltage received from the high voltage energy supply 122 by a factor of at least two to a voltage equal to or greater than 1,200 volts and less than 2,000 volts. In embodiments, the direct current controller 124 increases the voltage received from the high voltage energy supply 122 by a factor of at least three to a voltage equal to or greater than 1,800 volts and less than 3,000 volts. The first turbine engine assembly 102 further includes an integrated converter 126 electrically coupled between the direct current controller 124 and the electric motor 110. The integrated converter 126 converts the energy received from the direct current controller 124 to a three phase alternating current (AC) output. The three phase AC output is then provided to the electric motor 110.

In embodiments, a pressure sensor 128, for example, a compressor discharge pressure (CDP) sensor, is located in the gas turbine engine 108 to detect a pressure within the gas turbine engine 108, a core speed sensor 130 is located in the gas turbine engine 108 for detecting a speed of a core of the gas turbine engine 108, an engine torque sensor 132 is provided at the engine shaft 116 for detecting a torque provided by the gas turbine engine 108, a motor torque sensor 134 is provided at the motor shaft 118 for detecting a torque provided by the electric motor 110, a propeller torque sensor 136 is located at the propeller 112 to detect the torque of the propeller 112, and a wheel weight sensor 138 provided on one or more wheels of the aircraft 100 to detect a force against the wheels of the aircraft 100 from a ground surface.

It should be appreciated that the second turbine engine assembly 104 includes identical structure and operates in the same manner as the first turbine engine assembly 102, and thus will be referred to herein with like reference numbers. Specifically, the second turbine engine assembly 104 includes a gas turbine engine 108, an electric motor 110, and a propeller 112 powered by both the power output of the gas turbine engine 108 and the electric motor 110 of the second turbine engine assembly 104. Additionally, the second turbine engine assembly 104 further includes a combining gear box 114 coupled to the gas turbine engine 108 by an engine shaft 116 and the electric motor 110 by a motor shaft 118. The second turbine engine assembly 104 further includes a propeller gear box 120 positioned between the propeller 112 and the combining gear box 114 of the second turbine engine assembly 104.

The second turbine engine assembly 104 further includes a high voltage energy supply 122 that delivers a power supply to a direct current controller 124, which increases the voltage received from the high voltage energy supply 122 and provides the increased voltage to an integrated converter 126 electrically coupled between the direct current controller 124 and the electric motor 110. The integrated converter 126 converts the energy received from the direct current controller 124 of the second turbine engine assembly 104 to a three phase AC output, which is provided to the electric motor 110.

Figure 2:
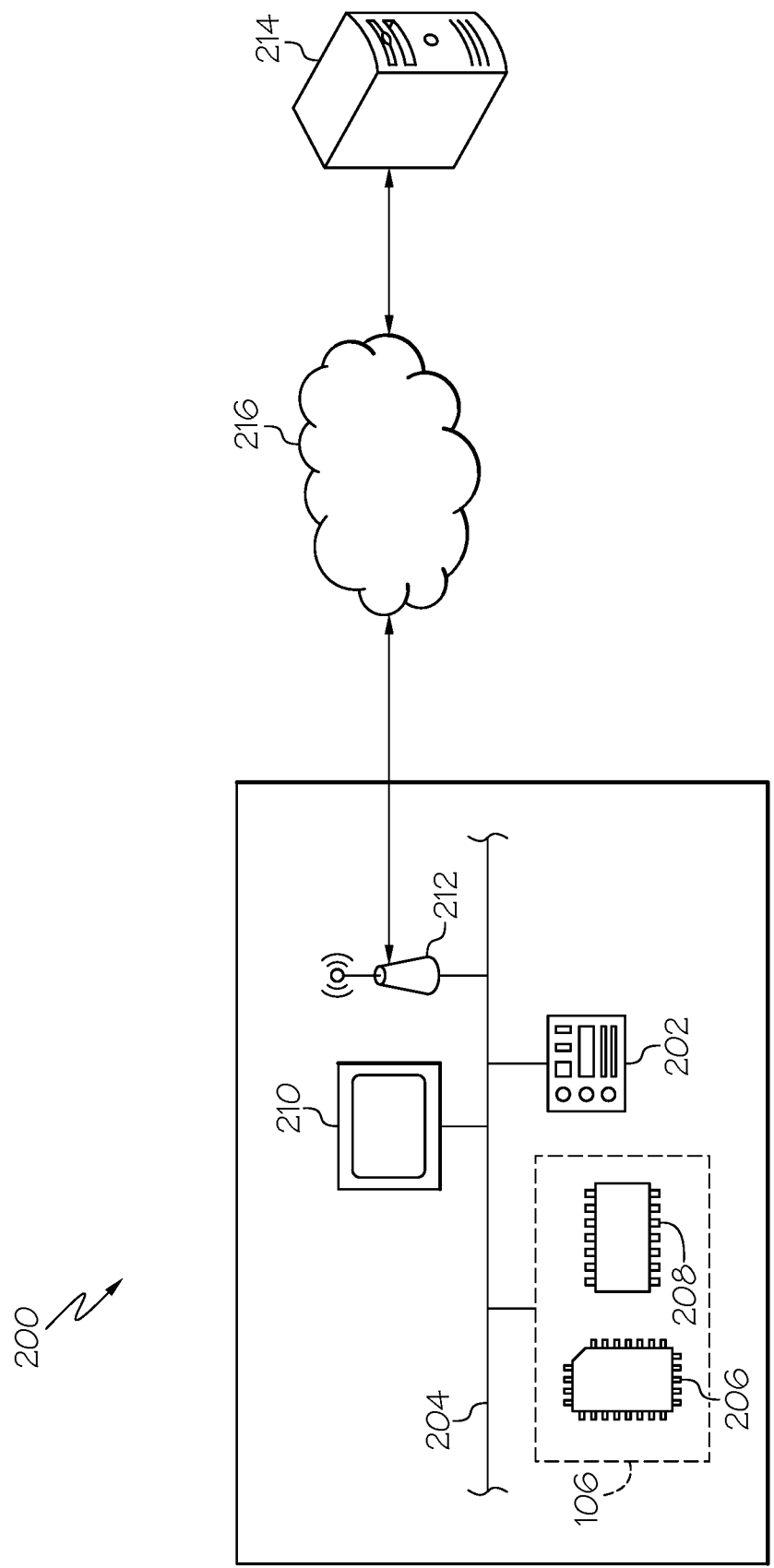
FIG. 2 schematically depicts a flight control system including an electronic control unit configured to operate components of the aircraft of FIG. 1, according to one or more embodiments shown and described herein.

Referring now to FIG. 2, a flight control system 200 may be provided for operating the first turbine engine assembly 102 and the second turbine engine assembly 104, and particularly the gas turbine engines 108 and the electric motors 110, for controlling a torque provided to the propellers 112. Thus, the flight control system 200 may include the electronic control unit 106, an operating device 202, and a communication path 204. The various components of the flight control system 200 will now be described.

The electronic control unit 106 includes a processor 206 and a non-transitory electronic memory 208 to which various components are communicatively coupled. In some embodiments, the processor 206 and the non-transitory electronic memory 208 and/or the other components are included within a single device. In other embodiments, the processor 206 and the non-transitory electronic memory 208 and/or the other components may be distributed among multiple devices that are communicatively coupled. The electronic control unit 106 includes non-transitory electronic memory 208 that stores a set of machine-readable instructions. The processor 206 executes the machine-readable instructions stored in the non-transitory electronic memory 208. The non-transitory electronic memory 208 may comprise random access memory (RAM), read only memory (ROM), flash memories, hard drives, or any device capable of storing machine-readable instructions such that the machine-readable instructions can be accessed by the processor 206. Accordingly, the flight control system 200 described herein may be implemented in any conventional computer programming language, as pre-programmed hardware elements, or as a combination of hardware and software components. The non-transitory electronic memory 208 may be implemented as one memory module or a plurality of memory modules. In some embodiments, the non-transitory electronic memory 208 includes instructions for executing the functions of the flight control system 200. The instructions may include instructions for operating the gas turbine engines 108 and the electric motors 110 based on a user command.

The processor 206 may be any device capable of executing machine-readable instructions. For example, the processor 206 may be an integrated circuit, a microchip, a computer, or any other computing device. The non-transitory electronic memory 208 and the processor 206 are coupled to the communication path 204 that provides signal interconnectivity between various components and/or modules of the flight control system 200. Accordingly, the communication path 204 may communicatively couple any number of processors with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 2, the communication path 204 communicatively couples the processor 206 and the non-transitory electronic memory 208 of the electronic control unit 106 with a plurality of other components of the flight control system 200. For example, the flight control system 200 depicted in FIG. 2 includes the processor 206 and the non-transitory electronic memory 208 communicatively coupled with the operating device 202.

The operating device 202 allows for a user to control operation of the gas turbine engines 108 and the electric motors 110. In addition, the operating device 202 allows for a user to enter parameters, such as a desired torque or speed utilized to determine appropriate operation of the gas turbine engines 108 and the electric motors 110. In some embodiments, the operating device 202 may be a switch, toggle, button, or any combination of controls to provide user operation. The operating device 202 may also include any of the levers discussed herein for individually controlling the amount of power delivered to the gas turbine engines 108 and the electric motors 110.

The operating device 202 is coupled to the communication path 204 such that the communication path 204 communicatively couples the operating device 202 to other modules of the flight control system 200. The operating device 202 may provide a user interface for receiving user instructions as to a specific operating condition of the gas turbine engines 108 and the electric motors 110.

In some embodiments, the flight control system 200 also includes a display device 210. The display device 210 is coupled to the communication path 204 such that the communication path 204 communicatively couples the display device 210 to other modules of the flight control system 200. The display device 210 may output a notification in response to operation of the gas turbine engines 108 and the electric motors 110. Moreover, the display device 210 may be a touchscreen that, in addition to providing optical information, detects the presence and location of a tactile input upon a surface of or adjacent to the display device 210. Accordingly, the display device 210 may include the operating device 202 and receive mechanical input directly upon the optical output provided by the display device 210. In embodiments, the display device 210 may display real-time performance metrics of the gas turbine engines 108 and the electric motors 110, as well as other components of the aircraft 100. Example performance metrics may include torque provided by the gas turbine engines 108 and the electric motors 110, failure of any of the gas turbine engines 108 and the electric motors 110, and required adjustments in performance of the remaining gas turbine engines 108 and the electric motors 110.

In some embodiments, the flight control system 200 includes network interface hardware 212 for communicatively coupling the flight control system 200 to a server 214 via a network 216. The server 214 may include any computing device such as, for example, a central aircraft communication tower, a portable device, and the like. It is to be appreciated that, when provided, the server 214 may serve to provide user commands to the electronic control unit 106, instead of the operating device 202. In addition, the server 214 may server to provide additional information that the electronic control unit 106 utilizes to determine appropriate operating commands for the gas turbine engines 108 and the electric motors 110. For example, the server 214 may include a database of reference values indicating appropriate torque, speed, and other parameters at which the gas turbine engines 108 and the electric motors 110 should be operated given environmental conditions of the aircraft 100. As noted herein, example environmental conditions may include temperature, altitude, humidity, and the like.

Figure 3:
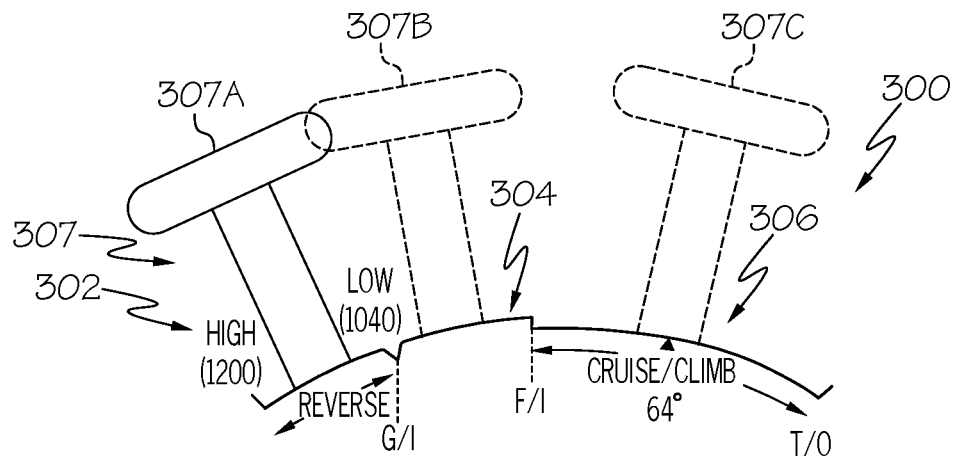
FIG. 3 schematically depicts a power lever control meter and a power lever, according to one or more embodiments shown and described herein.

Referring now to FIG. 3, a power lever control meter 300 is illustrated. The power lever control meter 300 is provided for allowing a user to control the amount of power to be provided to the gas turbine engines 108 and subsequent torque to the propellers 112. The power lever control meter 300 includes a first section 302, a second section 304, and a third section 306. The first section 302 is associated with a reverse operation, the second section 304 is associated with a taxi operation, and the third section 306 is associated with a cruise/climb operation. A power lever 307 may be operated, such as by moving forward or backward, to cause the power lever control meter 300 to be shifted into any one of the first section 302, the second section 304, and the third section 306, and operate the gas turbine engines 108 appropriately. For example, when the power lever 307 is positioned in a first position 307A such that the power lever control meter 300 is shifted into the first section 302, the gas turbine engines 108 operate to rotate the propellers 112 in a first rotational direction such that a pitch angle of the blades of the propellers 112 provides a negative thrust to move the aircraft 100 in a rearward direction. When the power lever 307 is positioned in a second position 307A such that the power lever control meter 300 is shifted into the second section 304, the gas turbine engines 108 operate to provide a first amount of torque to rotate the propellers 112 in an opposite second rotational direction or forward direction to move the aircraft 100 in a forward direction. When the power lever 307 is positioned in a third position 307C such that the power lever control meter 300 is shifted into the third section 306, the gas turbine engines 108 may operate to provide a second amount of torque greater than the first amount of torque to rotate the propellers 112 in the second rotational or forward direction to move the aircraft 100 in the forward direction. Additionally, it should be appreciated that the power lever 307 may be positioned at a plurality of incremental positions to adjust the amount of torque provided to the gas turbine engines 108 when in the third section 306. For example, the power lever 307 may be positioned to provide "part power" to the gas turbine engines 108 by positioning the power lever control meter 300 closer to the second section 304 as opposed to providing "max power" by positioning the power lever control meter 300 furthest from the second section 304.

Figure 4:
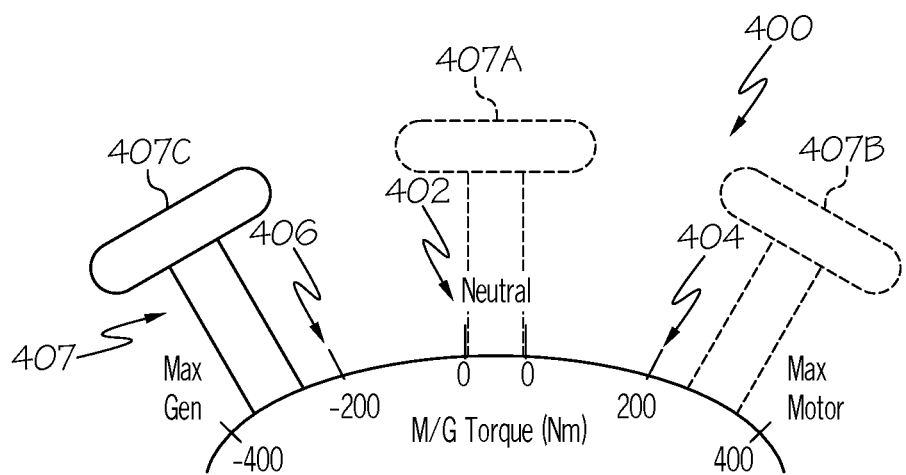
FIG. 4 schematically depicts an electric lever control meter and an electric lever, according to one or more embodiments shown and described herein.

Referring now to FIG. 4, an electric lever control meter 400 is illustrated. The electric lever control meter 400 is provided for allowing a user to control the amount of power to be provided to the electric motors 110 and subsequent torque to be provided to the propellers 112. The electric lever control meter 400 includes a neutral section 402, a motor section 404, and a generator section 406. An electric lever 407 may be operated, such as by moving forward or backward, to cause the electric lever control meter 400 to be shifted into any one of the neutral section 402, the motor section 404, and the generator section 406, and operate the electric motors 110 appropriately. For example, when the electric lever 407 is positioned in a first position 407A such that the electric lever control meter 400 is shifted into the neutral section 402, the electric motors 110 operate to provide no torque to the propellers 112. When the electric lever 407 is positioned in a second position 407B such that the electric lever control meter 400 is shifted into the motor section 404, the electric motors 110 operate to provide torque to the propellers 112 and rotate the propellers 112 in the forward direction. When the electric lever 407 is positioned in a third position 407C such that the electric lever control meter 400 is shifted into the generator section 406, the electric motors 110 are operated to generate energy, but not provide any torque to the propellers 112. Additionally, it should be appreciated that the electric lever 407 may be positioned at a plurality of incremental positions within each of the motor section 404 and the generator section 406. For example, the electric lever 407 may be positioned such that the electric lever control meter 400 is shifted within the motor section 404 and closer to the neutral section 402 to provide a lesser amount of torque to the propellers 112 as compared to when the electric lever control meter 400 is shifted within the motor section 404 and further from the neutral section 402, i.e., closer to the "max motor" indicator. As discussed in more detail herein, the amount of torque provided by the gas turbine engines 108 and the electric motors 110 is combined by the combining gear box 114 and the propeller gear box 120 to cause the propellers 112 to rotate.

Figure 5:
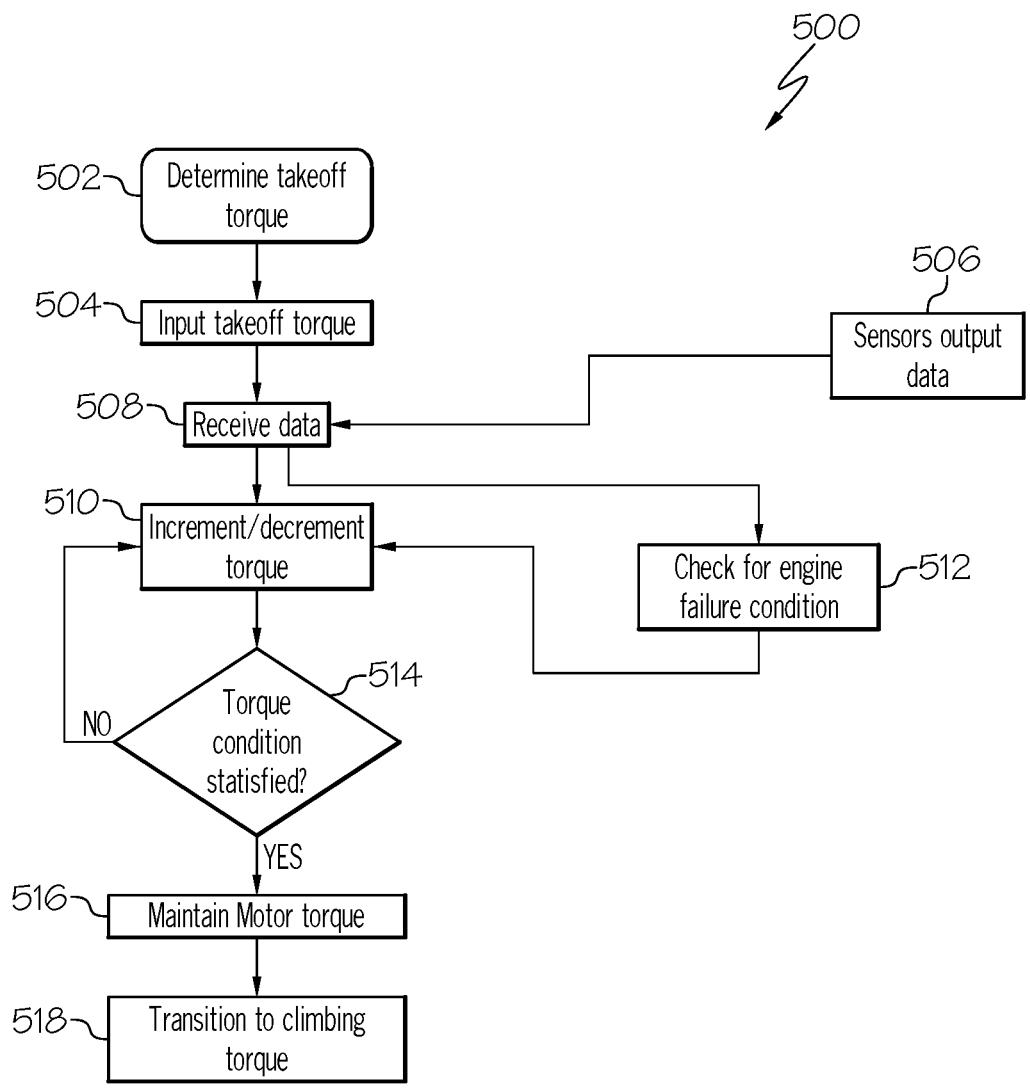
FIG. 5 depicts a flowchart of a method for controlling the aircraft of FIG. 1, according to one or more embodiments shown and described herein.

Referring now to FIG. 5, a method 500 for controlling a cumulative output provided to the propellers 112 of the aircraft 100 is depicted with reference to FIGS. 1-4. At step 502, a reference takeoff value, such as a reference takeoff torque, is determined. It should be appreciated that the reference takeoff torque identifies the optimal torque that the propellers 112 should exhibit during takeoff. In embodiments, the reference takeoff torque may be determined by the user referencing a takeoff torque database provided by the server 214, which may be viewed on the display device 210 of the flight control system 200. The reference takeoff torque may be determined based on environmental parameters such as, for example, temperature, altitude, humidity, and the like. In some embodiments, the environmental parameters may be entered by the user at the operating device 202 and the flight control system 200 will automatically determine the reference takeoff torque based on information received from the server 214. In embodiments, the reference takeoff torque may be a predetermined value previously associated with the entered environmental parameters, such as that provided in a reference or look up table of values based on environmental parameters.

Once the reference takeoff torque is determined, the reference takeoff torque is input into the flight control system 200 at step 504. As described in more detail herein, the reference takeoff torque is utilized as a maximum torque to be exhibited on the propellers 112 during takeoff. As such, the power provided to the electric motors 110 may be automatically adjusted during a takeoff routine to ensure that the torque applied to the propellers 112 does not exceed the reference takeoff torque.

At step 506, data is collected the one or more sensors and at step 508, the flight control system 200 receives the data from, which is utilized to determine whether an engine failure condition is satisfied and/or whether the power provided by the electric motors 110 should be increased or decreased. Specifically, at step 508, the flight control system 200 receives data from one or more sensors such as, for example, the pressure sensor 128 located in each of the gas turbine engines 108 to detect a pressure within each of the gas turbine engines 108, the core speed sensor 130 located in each of the gas turbine engines 108 for detecting a speed of a core of each gas turbine engine 108, the propeller torque sensor 136 located at each propeller 112 to detect the torque of each propeller 112, and the wheel weight sensor 138 provided on one or more wheels of the aircraft 100 to detect a force against the wheels of the aircraft 100 from the ground surface. In embodiments, data pertaining to a state of charge of the high voltage energy supplies 122 may be received at step 508. If the state of charge is below a predetermined threshold, it may be determined that the electric motors 110 should not be used. As such, the method 500 would end and the aircraft 100 would utilize only the gas turbine engines 108.

Initially, the power lever 307 is positioned such that the power lever control meter 300 is within the third section 306 and, more specifically, at "part power". This sets the gas turbine engine 108 to a first engine mode to provide a first engine output to the propellers 112. In addition, the electric lever 407 may be positioned such that the electric lever control meter 400 is within the motor section 404 and, more specifically, furthest from the neutral section 402, i.e., at the "max motor". This sets the electric motors 110 to a first motor mode to provide a first motor output to the propellers 112. It should be appreciated that a sum of the first engine output and the first motor output is within a predetermined range of the target cumulative output to the propellers 112.

At step 510, despite the electric lever control meter 400 being at the "max motor" position, the power provided by the electric motors 110 is adjusted by the electronic control unit 106, i.e., incremented, such that the cumulative power provided by the gas turbine engines 108 and the electric motors 110 does not exceed the reference takeoff torque. It should be appreciated that this may occur in response to the aircraft 100 exceeding a target speed, for example, 60 knots, at which a torque bloom effect is likely to occur, which results in the first engine output increasing to a second engine output greater than the first engine output. As such, the power provided to the electric motors 110 is incremented to adjust the torque provided to the propellers 112 in response to detecting that the torque provided by the gas turbine engines 108 increases. More specifically, the power provided by the electric motors 110 may be adjusted by setting the electric motor 110 to a second motor mode to provide a second motor output to the propellers 112. The second motor output is less than the first motor output. Additionally, a sum of the second engine output and the second motor output remains within the predetermined range of the target cumulative output.

At step 512, an engine failure check is performed to determine whether an engine failure condition has occurred. Specifically, at step 512, it is determined whether the speed of the core of each of the gas turbine engines 108, detected by the core speed sensors 130, is less than a predetermined core speed threshold such as, for example 55%. In another embodiment, it may be determined that an engine failure condition has occurred if a pressure of the one of the gas turbine engines 108, as detected by the pressure sensors 128, is less than a predetermined pressure threshold such as, for example 70 psi. If it is determined that the engine failure condition is satisfied, such as the speed of the core of one of the gas turbine engines 108 is less than the predetermined core speed threshold or the pressure of one of the gas turbine engines 108 is less than the predetermined pressure threshold, the method 500 returns to step 510 and the power provided by the electric motor 110 associated with the other gas turbine engine 108, which has not exhibited an engine failure, is increased by a predetermined electric motor torque increase such as, for example, 5%, 6%, 7%, 8%, 9%, or 10%. In embodiments, the power provided by the electric motor 110 associated with the other gas turbine engine 108 is increased by 7% to compensate for the lack of power provided by the other gas turbine engine 108. It should be appreciated that, in embodiments, the method 500 may bypass the engine failure check performed at step 512.

At step 514, a determination is made as to whether a torque condition has been satisfied. Specifically, at step 514, it may be determined that the torque condition is not satisfied, for example, if the torque provided to the propellers 112, detected by the propeller torque sensor 136, is less than or greater than the reference takeoff torque by a predetermined amount. If it is determined that the torque provided to the propellers 112 is less than or greater than the reference takeoff torque, the method 500 returns to step 510 so the torque provided by the electric motors 110 may be adjusted by the electronic control unit 106, i.e., incremented or decremented, such that the torque at the propellers 112 is equal to the reference takeoff torque. In addition, at step 514, it may be determined that the torque condition is not satisfied if the torque provided by the electric motors 110 exceeds a maximum motor torque threshold. If so, the method 500 returns to step 510 so the torque provided by the electric motors 110 may be adjusted by the electronic control unit 106 to reduce the torque at the propellers 112.

If it is determined at step 514 that the torque condition is satisfied, the torque provided to the propellers 112 by the electric motors 110 is maintained at step 516 until it is determined, based on the data received from the wheel weight sensors 138, that the aircraft is climbing. Specifically, it may be determined at step 516 that the aircraft is climbing based on the data received from the wheel weight sensors 138 being below a predetermined weight threshold indicating a decreased force against the wheels. Once it is determined that the aircraft 100 is climbing, the torque provided to the propellers 112 is transitioned to a climbing torque at step 518. The climbing torque may correspond to a reference climbing torque determined by the server 214 or the flight control system 200. To transition the torque to the climbing torque, the power provided to the electric motors 110 is decreased such that the torque provided to the propellers 112 is provided solely by the gas turbine engines 108.

Figure 6:
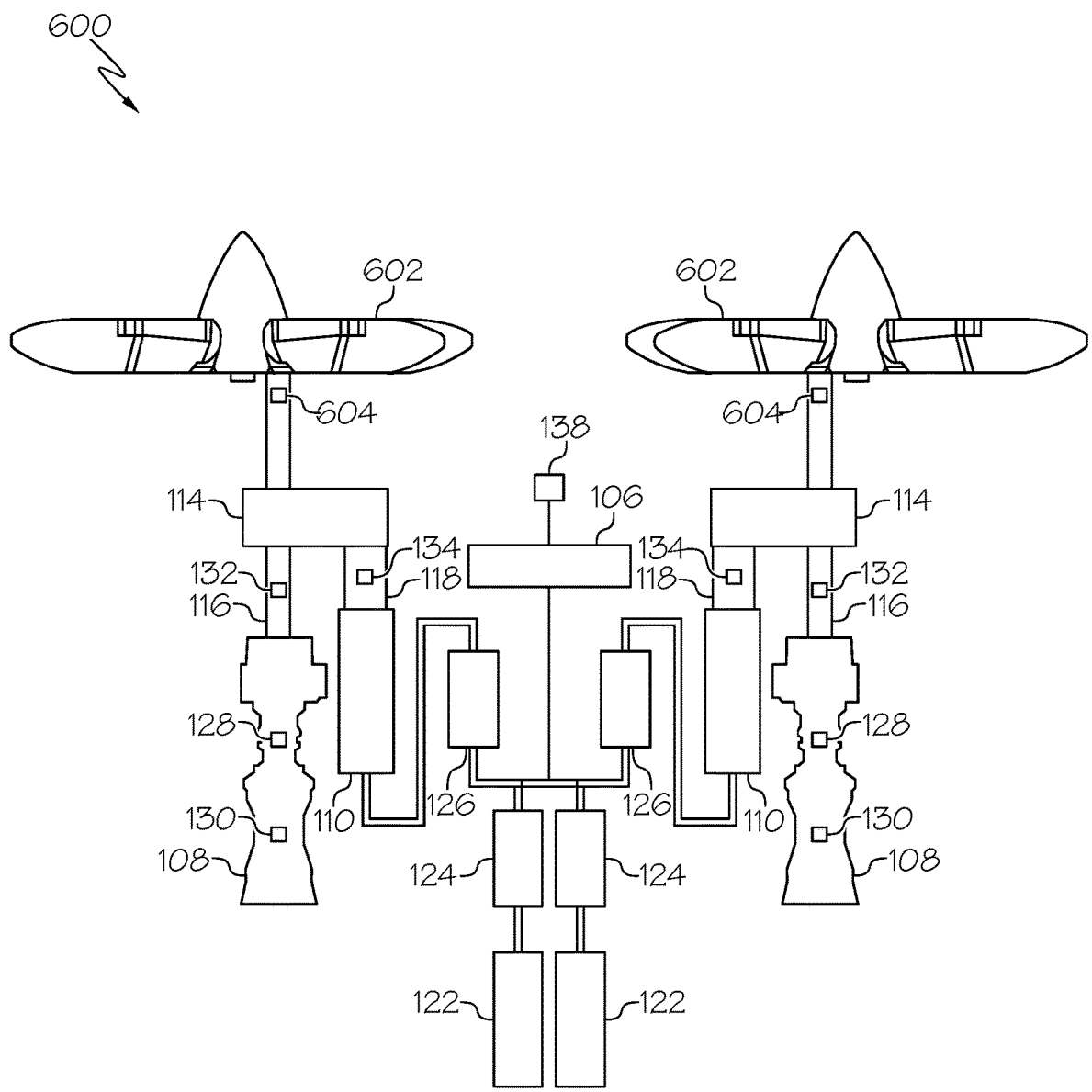
FIG. 6 schematically depicts an embodiment of an aircraft, according to one or more embodiments shown and described herein.

Referring now to FIG. 6, an embodiment of an aircraft 600 is illustrated. It should be understood that the aircraft 600 is similar to the aircraft 100 described herein illustrated in FIG. 1 with the exception that the aircraft 600 is a turbofan aircraft as opposed to a turboprop aircraft. Accordingly, the aircraft 600 includes like parts and will be referenced with like reference numbers. However, the aircraft 600 does not require a propeller gear box 120. Instead, the torque provided by the gas turbine engines 108 and the electric motors 110 is combined at the combining gear box 114 and provided directly to a pair of fans 602 as the propulsion devices. It should be appreciated that all other aspects of the aircraft 600 are the same as the aircraft 100.

Figure 7:
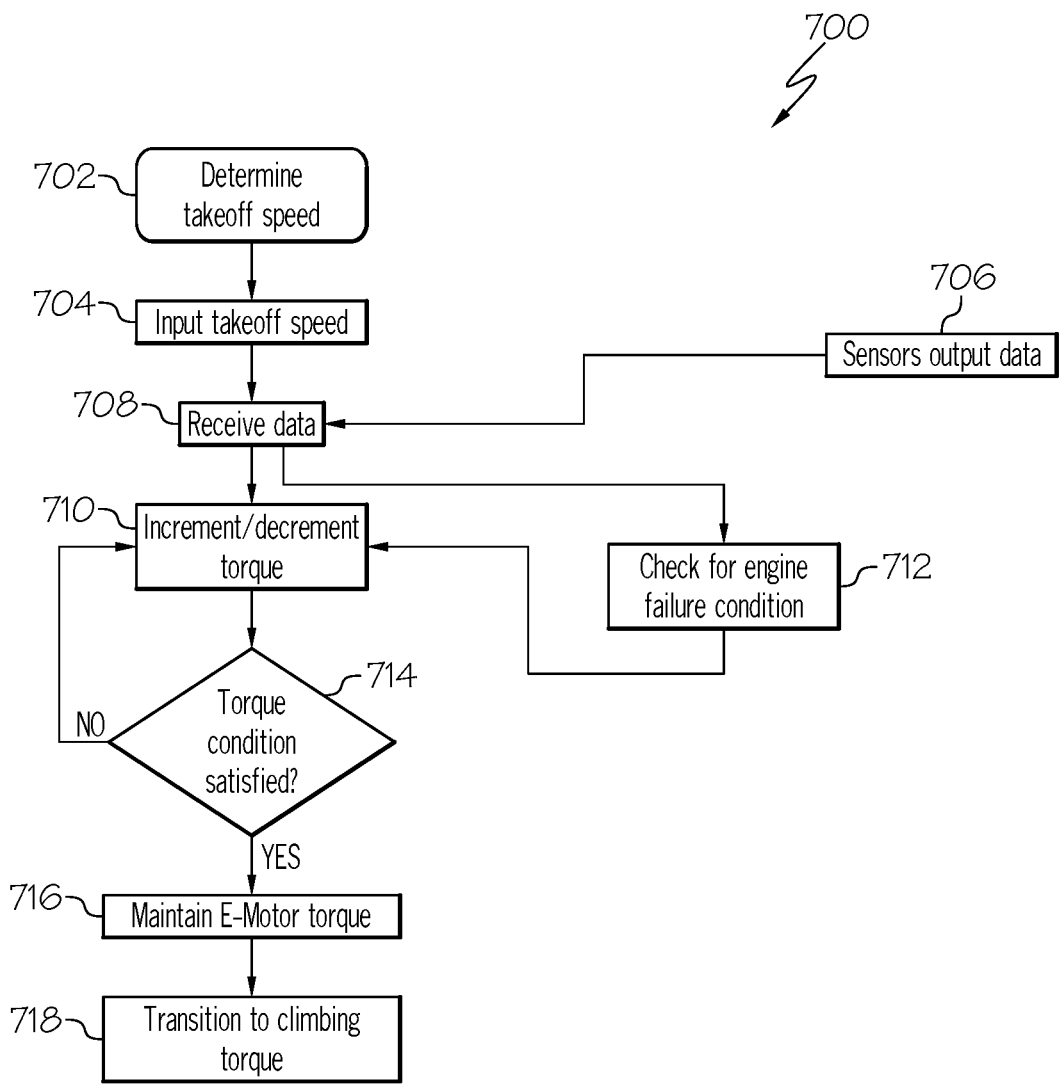
FIG. 7 depicts a flowchart of a method for controlling the aircraft of FIG. 6, according to one or more embodiments shown and described herein.

Referring now to FIG. 7, a method 700 for controlling the cumulative power provided to the fans 602 of the aircraft 600 is depicted and with reference to FIGS. 2-4. At step 702, a reference fan speed is determined. It should be appreciated that the reference fan speed identifies the optimal speed that the fans 602 should exhibit during takeoff. In embodiments, the reference fan speed may be determined by the user referencing a fan speed database provided by the server 214, which may be viewed on the display device 210 of the flight control system 200. As with the reference takeoff torque discussed above, the reference speed may be determined based on environmental parameters such as, for example, temperature, altitude, humidity, and the like. In some embodiments, the environmental parameters may be entered by the user at the operating device 202 and the flight control system 200 will automatically determine the reference fan speed based on information received from the server 214.

Once the reference fan speed is determined, the reference fan speed is inputted into the flight control system 200 at step 704. As described in more detail herein, the reference fan speed is utilized as a maximum speed to be exhibited by the fans 602 during takeoff. As such, the power provided to the electric motors 110 may be automatically adjusted during a takeoff routine to ensure that the speed of the fans 602 does not exceed the reference fan speed.

At step 706, data is collected from one or more sensors and the flight control system 200 receives the collected data from the one or more sensors at step 708. The collected data is utilized to determine whether an engine failure condition is satisfied and/or whether the power provided by the electric motors 110 should be increased or decreased. Specifically, at step 708, the flight control system 200 receives data from one or more sensors, as shown in FIG. 6, such as, for example, the pressure sensor 128 located in each of the gas turbine engines 108 to detect a pressure within each of the gas turbine engines 108, the core speed sensor 130 located in each of the gas turbine engines 108 for detecting a speed of a core of each gas turbine engine 108, a fan speed sensor 604 configured to detect the speed of the fans 602, and the wheel weight sensor 138 provided on one or more wheels of the aircraft 600 to detect a force against the wheels of the aircraft from the ground surface. In embodiments, data pertaining to a state of charge of the high voltage energy supplies 122 may be received at step 708. If the state of charge is below a predetermined threshold, it may be determined that the electric motors 110 should not be used. As such, the method 700 would end and the aircraft 600 would utilize only the gas turbine engines 108.

Initially, the power lever 307 is positioned such that the power lever control meter 300 is within the third section 306 and, more specifically, at "part power". This sets the gas turbine engines 108 to a first engine mode to provide a first engine output to the fans 602. In addition, the electric lever 407 may be positioned such that the electric lever control meter 400 is within the motor section 404 and, more specifically, furthest from the neutral section, i.e., at the "max motor". This sets the electric motors 110 to a first motor mode to provide a first motor output to the fans 602. It should be appreciated that a sum of the first engine output and the first motor output is within a predetermined range of the target cumulative output to the fans 602.

At step 710, despite the electric lever control meter 400 being at the "max motor" position, the power provided by the electric motors 110 is adjusted by the electronic control unit 106, i.e., incremented, such that the cumulative power provided by the gas turbine engines 108 and the electric motors 110 does not result in the fan speed exceeding the reference fan speed. As discussed above, it should be appreciated that this may occur in response to the aircraft 600 exceeding a target speed, for example, 60 knots, at which a torque bloom effect is likely to occur, which results in the first engine output increasing to a second engine output greater than the first engine output. As such, the power provided to the electric motors 110 is also incremented to adjust the speed of the fans 602 in response to detecting that the speed of the core of the gas turbine engines 108 increases. More specifically, the power provided by the electric motors 110 may be adjusted by setting the electric motors 110 to a second motor mode to provide a second motor output to the fans. The second motor output is less than the first motor output. Additionally, a sum of the second engine output and the second motor output remains within the predetermined range of the target cumulative output.

At step 712, it is determined whether an engine failure condition has occurred. Specifically, at step 712, it is determined whether the speed of the core of each of the gas turbine engines 108, detected by the core speed sensors 130, is less than a predetermined core speed threshold such as, for example 50%. If it is determined that the speed of the core of one of the gas turbine engines 108 is less than the predetermined core speed threshold, the method 700 returns to step 710 and the power provided by the electric motor 110 associated with the other gas turbine engine 108 is increased by a predetermined electric motor torque increase such as, for example, 5%, 6%, 7%, 8%, 9%, or 10%. In embodiments, the power provided by the electric motor 110 associated with the other gas turbine engine 108 is increased by 7% to compensate for the lack of power provided by the other gas turbine engine 108. As discussed above, it may be determined that an engine failure condition may have occurred based on a pressure of the gas turbine engines 108, detected by the pressure sensor 128, falling below a predetermined pressure threshold.

At step 714, a determination is made as to whether a torque condition has been satisfied. Specifically, at step 714, it may be determined that the torque condition is not satisfied if the speed of the fans 602, detected by the fan speed sensor 604, is less than or greater than the reference fan speed by a predetermined amount. If it is determined that the speed of the fans 602 is less than or greater than the reference fan speed, the method 700 returns to step 710 so the torque provided by the electric motors 110 may be adjusted, i.e., incremented or decremented, such that the speed of the fans 602 is equal to the reference fan speed. In addition, at step 714, it may be determined that the torque condition is not satisfied if the torque provided by the electric motors 110 exceeds a maximum motor torque threshold. If so, the method 700 returns to step 710 so the torque provided by the electric motors 110 may be adjusted to reduce the speed of the fans 602.

At step 716, if the torque condition is not satisfied, the torque provided to the propeller by the electric motors 110 is maintained until it is determined, based on the data received from the wheel weight sensors 138, that the aircraft 600 is climbing. Specifically, it may be determined at step 716 that the aircraft 600 is climbing based on the data received from the wheel weight sensors 138 being below a predetermined weight threshold indicating a decreased of force against the wheels. Once it is determined that the aircraft 600 is climbing, the torque provided to the fans 602 is transitioned to a climbing torque at step 718. Similar to that described above with respect to the method 500, the climbing torque may correspond to a reference climbing torque determined by the server or the flight control system 200. To transition the torque to the climbing torque, the power provided to the electric motors 110 is decreased such that the speed of the fans 602 is controlled solely by the gas turbine engines 108.

From the above, it is to be appreciated that defined herein is an aircraft including an electronic control unit configured to adjust power provided by an electric motor to a propulsion device, such as a propeller, to maintain the power provided to the propulsion device within a predetermined threshold of the target cumulative output. In doing so, the potential torque bloom effect is minimized by increasing the power provided by the electric motor rather than a gas turbine engine, which is more susceptible to changes in airflow through the gas turbine engine and increasing a torque to the propulsion device. As such, the power provided to a propulsion device is maintained throughout a takeoff operation of an aircraft as opposed to those aircrafts that manually adjust a power provided to a propulsion device using a CTOT mechanism and without assistance from an electric motor.

Further aspects of the embodiments described herein are provided by the subject matter of the following clauses:

Clause 1. An aircraft comprising: a gas turbine engine; an electric motor; a propulsion device operatively coupled to the gas turbine engine and the electric motor, the gas turbine engine and the electric motor configured to provide a target cumulative output to the propulsion device; and an electronic control unit configured to: setting the gas turbine engine to a first engine mode to provide a first engine output to the propulsion device; setting the electric motor to a first motor mode to provide a first motor output to the propulsion device, a sum of the first engine output and the first motor output being within a predetermined range of the target cumulative output; and in response to a speed of the aircraft reaching a target speed and the first engine output increasing to a second engine output, setting the electric motor to a second motor mode to provide a second motor output to the propulsion device, the second motor output being less than the first motor output of the electric motor, a sum of the second engine output and the second motor output being within the predetermined range of the target cumulative output.

Clause 2. The aircraft of any preceding clause, further comprising a combining gear box in communication with the gas turbine engine and the electric motor.

Clause 3. The aircraft of any preceding clause, further comprising a propeller gear box, and wherein the propulsion device comprises a propeller, the propeller gear box provided between the propeller and the combining gear box.

Clause 4. The aircraft of any preceding clause, wherein the electronic control unit is configured to increase the power delivered to the electric motor by a predetermined amount in response to detecting a failure event associated with a second gas turbine engine.

Clause 5. The aircraft of any preceding clause, further comprising a pressure sensor configured to detect a pressure within the second gas turbine engine, wherein the electronic control unit is further configured to increase the power delivered to the electric motor in response to detecting that the pressure within the second gas turbine engine is less than a predetermined pressure threshold.

Clause 6. The aircraft of any preceding clause, further comprising a core speed sensor configured to detect rotational speed of a core of the second gas turbine engine, wherein the electronic control unit is further configured to increase the power delivered to the electric motor in response to detecting that the rotational speed of the core of the second gas turbine engine is less than a predetermined core speed threshold.

Clause 7. The aircraft of any preceding clause, further comprising a wheel weight sensor configured to detect a weight on a wheel of the aircraft, wherein the electronic control unit is further configured to increase the power delivered to the gas turbine engine and decrease the power delivered to the electric motor in response to detecting that the weight on the wheel of the aircraft is below a wheel weight threshold.

Clause 8. An electronic control unit configured to: set a gas turbine engine of an aircraft to a first engine mode to provide a first engine output to a propeller of the aircraft; set an electric motor of the aircraft to a first motor mode to provide a first motor output to the propeller, the propeller operatively coupled to the gas turbine engine and the electric motor, a sum of the first engine output and the first motor output being within a predetermined range of a target cumulative output; in response to a speed of the aircraft reaching a target speed and the first engine output increasing to a second engine output, set the electric motor to a second motor mode to provide a second motor output to the propeller, the second motor output being less than the first motor output of the electric motor, a sum of the second engine output and the second motor output being within the predetermined range of the target cumulative output; and increasing the power delivered to the gas turbine engine and decreasing the power delivered to the electric motor in response to determining that the aircraft is increasing in altitude.

Clause 9. The electronic control unit of any preceding clause, further comprising a combining gear box in communication with the gas turbine engine and the electric motor.

Clause 10. The electronic control unit of any preceding clause, wherein the electronic control unit is configured to increase the power delivered to the electric motor by a predetermined amount in response to detecting a failure event associated with a second gas turbine engine.

Clause 11. The electronic control unit of any preceding clause, wherein the electronic control unit is further configured to receive a detected pressure within the second gas turbine engine detected by a pressure sensor, wherein the electronic control unit is further configured to increase the power delivered to the electric motor in response to determining that the pressure within the second gas turbine engine is less than a predetermined pressure threshold.

Clause 12. The electronic control unit of any preceding clause, wherein the electronic control unit is further configured to receive a detected rotational speed of a core of the second gas turbine engine detected by a speed sensor, wherein the electronic control unit is further configured to increase the power delivered to the electric motor in response to determining that the rotational speed of the core of the second gas turbine engine is less than a predetermined core speed threshold.

Clause 13. The electronic control unit of any preceding clause, wherein the electronic control unit is further configured to receive a detected weight on a wheel of the aircraft detected by a wheel weight sensor, wherein the electronic control unit is further configured to increase the power delivered to the gas turbine engine and decrease the power delivered to the electric motor in response to determining that the weight on the wheel of the aircraft is below a wheel weight threshold.

Clause 14. A method comprising: setting an gas turbine engine of an aircraft to a first engine mode to provide a first engine output to a propulsion device; setting an electric motor of the aircraft to a first motor mode to provide a first motor output to the propulsion device, a sum of the first engine output and the first motor output being within a predetermined range of the target cumulative output; and in response to a speed of the aircraft reaching a target speed and the first engine output increasing to a second engine output, setting the electric motor to a second motor mode to provide a second motor output to the propulsion device, the second motor output being less than the first motor output of the electric motor, a sum of the second engine output and the second motor output being within the predetermined range of the target cumulative output.

Clause 15. The method of any preceding clause, further comprising providing a combining gear box in communication with the gas turbine engine and the electric motor.

Clause 16. The method of any preceding clause, further comprising providing a propeller gear box, and wherein the propulsion device comprises a propeller, the propeller gear box provided between the propeller and the combining gear box.

Clause 17. The method of any preceding clause, further comprising increasing the power delivered to the electric motor by a predetermined amount in response to detecting a failure event associated with a second gas turbine engine.

Clause 18. The method of any preceding clause, further comprising increasing the power delivered to the electric motor in response to detecting that a pressure within the second gas turbine engine is less than a predetermined pressure threshold.

Clause 19. The method of any preceding clause, further comprising increasing the power delivered to the electric motor in response to detecting that a rotational speed of a core of the second gas turbine engine is less than a predetermined core speed threshold.

Clause 20. The method of any preceding clause, further comprising increasing the power delivered to the gas turbine engine and decreasing the power delivered to the electric motor in response to detecting that a weight on a wheel of the aircraft is below a wheel weight threshold.

Clause 21. An electronic control unit configured to: receive a reference takeoff value corresponding to a target cumulative output; setting a gas turbine engine of an aircraft to a first engine mode to provide a first engine output to a propulsion device of the aircraft; setting an electric motor of the aircraft to a first motor mode to provide a first motor output to the propulsion device, a sum of a first engine output and a first motor output being within a predetermined range of the target cumulative output; and in response to a speed of the aircraft reaching a target speed and the first engine output increasing to a second engine output, setting the electric motor to a second motor mode to provide a second motor output to the propulsion device, the second motor output being less than the first motor output of the electric motor, a sum of the second engine output and the second motor output being within the predetermined range of the target cumulative output.

Clause 22. The electronic control unit of any preceding clause, wherein the electronic control unit is configured to increase the power delivered to the electric motor by a predetermined amount in response to detecting a failure event associated with a second gas turbine engine.

Clause 23. A computer-readable storage medium storing instructions that when executed by a computer cause the computer to perform a method for a computer system, the method comprising: receiving a reference takeoff value corresponding to a target cumulative output provided by a gas turbine engine and an electric motor of an aircraft; setting the gas turbine engine to a first engine mode to provide a first engine output to a propulsion device; setting the electric motor to a first motor mode to provide a first motor output to the propulsion device, a sum of the first engine output and the first motor output being within a predetermined range of the target cumulative output; and in response to a speed of the aircraft reaching a target speed and the first engine output increasing to a second engine output, setting the electric motor to a second motor mode to provide a second motor output to the propulsion device, the second motor output being less than the first motor output of the electric motor, a sum of the second engine output and the second motor output being within the predetermined range of the target cumulative output.

Clause 24. The computer-readable storage medium of any preceding clause, wherein the method further comprises providing a combining gear box in communication with the gas turbine engine and the electric motor.

Clause 25. The computer-readable storage medium of any preceding clause, wherein the method further comprises providing a propeller gear box, and wherein the propulsion device comprises a propeller, the propeller gear box provided between the propeller and the combining gear box.

Clause 26. The computer-readable storage medium of any preceding clause, wherein the method further comprises increasing the power delivered to the electric motor by a predetermined amount in response to detecting a failure event associated with a second gas turbine engine.

Clause 27. The computer-readable storage medium of any preceding clause, wherein the method further comprises increasing the power delivered to the electric motor in response to detecting that a pressure within the second gas turbine engine is less than a predetermined pressure threshold.

Clause 28. The computer-readable storage medium of any preceding clause, wherein the method further comprises increasing the power delivered to the electric motor in response to detecting that a rotational speed of a core of the second gas turbine engine is less than a predetermined core speed threshold.

Clause 29. The computer-readable storage medium of any preceding clause, wherein the method further comprises increasing the power delivered to the gas turbine engine and decreasing the power delivered to the electric motor in response to detecting that a weight on a wheel of the aircraft is below a wheel weight threshold.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. An aircraft comprising:
a gas turbine engine;
an electric motor;
a propulsion device operatively coupled to the gas turbine engine and the electric motor, the gas turbine engine and the electric motor configured to provide a target cumulative output to the propulsion device;
a wheel weight sensor configured to detect a weight on a wheel of the aircraft; and
an electronic control unit configured to:
set the gas turbine engine to a first engine mode to provide a first engine output to the propulsion device;
set the electric motor to a first motor mode to provide a first motor output to the propulsion device, a sum of the first engine output and the first motor output being within a predetermined range of the target cumulative output;
in response to a speed of the aircraft reaching a target speed and the first engine output increasing to a second engine output, set the electric motor to a second motor mode to provide a second motor output to the propulsion device, the second motor output being less than the first motor output of the electric motor, a sum of the second engine output and the second motor output being within the predetermined range of the target cumulative output; and
increase the power delivered to the gas turbine engine and decrease the power delivered to the electric motor in response to detecting that the weight on the wheel of the aircraft is below a wheel weight threshold.

2. The aircraft of claim 1, further comprising a combining gear box in communication with the gas turbine engine and the electric motor.

3. The aircraft of claim 2, further comprising a propeller gear box, and wherein the propulsion device comprises a propeller, the propeller gear box provided between the propeller and the combining gear box.

4. The aircraft of claim 3, wherein the electronic control unit is configured to increase the power delivered to the electric motor by a predetermined amount in response to detecting a failure event associated with a second gas turbine engine.

5. The aircraft of claim 4, further comprising a pressure sensor configured to detect a pressure within the second gas turbine engine, wherein the electronic control unit is further configured to increase the power delivered to the electric motor in response to detecting that the pressure within the second gas turbine engine is less than a predetermined pressure threshold.

6. The aircraft of claim 4, further comprising a core speed sensor configured to detect rotational speed of a core of the second gas turbine engine, wherein the electronic control unit is further configured to increase the power delivered to the electric motor in response to detecting that the rotational speed of the core of the second gas turbine engine is less than a predetermined core speed threshold.

7. An electronic control unit configured to:
set a gas turbine engine of an aircraft to a first engine mode to provide a first engine output to a propeller of the aircraft;
set an electric motor of the aircraft to a first motor mode to provide a first motor output to the propeller, the propeller operatively coupled to the gas turbine engine and the electric motor, a sum of the first engine output and the first motor output being within a predetermined range of a target cumulative output;

in response to a speed of the aircraft reaching a target speed and the first engine output increasing to a second engine output, set the electric motor to a second motor mode to provide a second motor output to the propeller, the second motor output being less than the first motor output of the electric motor, a sum of the second engine output and the second motor output being within the predetermined range of the target cumulative output;

increase the power delivered to the gas turbine engine and decreasing the power delivered to the electric motor in response to determining that the aircraft is increasing in altitude;

receive a detected weight on a wheel of the aircraft detected by a wheel weight sensor; and increase the power delivered to the gas turbine engine and decrease the power delivered to the electric motor in response to determining that the weight on the wheel of the aircraft is below a wheel weight threshold.

8. The electronic control unit of claim 7, further comprising a combining gear box in communication with the gas turbine engine and the electric motor.

9. The electronic control unit of claim 8, wherein the electronic control unit is configured to increase the power delivered to the electric motor by a predetermined amount in response to detecting a failure event associated with a second gas turbine engine.

10. The electronic control unit of claim 9, wherein the electronic control unit is further configured to receive a detected pressure within the second gas turbine engine detected by a pressure sensor, wherein the electronic control unit is further configured to increase the power delivered to the electric motor in response to determining that the pressure within the second gas turbine engine is less than a predetermined pressure threshold.

11. The electronic control unit of claim 9, wherein the electronic control unit is further configured to receive a detected rotational speed of a core of the second gas turbine engine detected by a speed sensor, wherein the electronic control unit is further configured to increase the power delivered to the electric motor in response to determining that the rotational speed of the core of the second gas turbine engine is less than a predetermined core speed threshold.

12. A method comprising:

setting a gas turbine engine of an aircraft to a first engine mode to provide a first engine output to a propulsion device;

setting an electric motor of the aircraft to a first motor mode to provide a first motor output to the propulsion device, a sum of the first engine output and the first motor output being within a predetermined range of a target cumulative output;

in response to a speed of the aircraft reaching a target speed and the first engine output increasing to a second engine output, setting the electric motor to a second motor mode to provide a second motor output to the propulsion device, the second motor output being less than the first motor output of the electric motor, a sum of the second engine output and the second motor output being within the predetermined range of the target cumulative output; and increasing the power delivered to the gas turbine engine and decreasing the power delivered to the electric motor in response to detecting that a weight on a wheel of the aircraft is below a wheel weight threshold.

13. The method of claim 12, further comprising providing a combining gear box in communication with the gas turbine engine and the electric motor.

14. The method of claim 13, further comprising providing a propeller gear box, and wherein the propulsion device comprises a propeller, the propeller gear box provided between the propeller and the combining gear box.

15. The method of claim 14, further comprising increasing the power delivered to the electric motor by a predetermined amount in response to detecting a failure event associated with a second gas turbine engine.

16. The method of claim 15, further comprising increasing the power delivered to the electric motor in response to detecting that a pressure within the second gas turbine engine is less than a predetermined pressure threshold.

17. The method of claim 15, further comprising increasing the power delivered to the electric motor in response to detecting that a rotational speed of a core of the second gas turbine engine is less than a predetermined core speed threshold.

* * * * *